(12) United States Patent
Pikovsky et al.

(10) Patent No.: US 8,260,929 B2
(45) Date of Patent: Sep. 4, 2012

(54) DEPLOYING ANALYTIC FUNCTIONS

(75) Inventors: Alexander Pikovsky, Lexington, MA (US); David Joel Pennell, Sr., Dripping Springs, TX (US); Robert Joseph McKeown, North Reading, MA (US); Colin Putney, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 12/621,739

(22) Filed: Nov. 19, 2009

(65) Prior Publication Data

US 2010/0066741 A1     Mar. 18, 2010

Related U.S. Application Data

(62) Division of application No. 12/056,877, filed on Mar. 27, 2008, now Pat. No. 7,882,219.

(51) Int. Cl.
*G06F 15/173* (2006.01)
(52) U.S. Cl. .......................... 709/226; 709/224; 345/440
(58) Field of Classification Search .................. 709/223, 709/226, 224; 706/47; 370/354; 1/1; 717/174; 345/440
See application file for complete search history.

(56) References Cited

U.S. PATENT DOCUMENTS

| | | | |
|---|---|---|---|
| 6,496,831 B1 | 12/2002 | Baulier et al. | |
| 6,502,133 B1 | 12/2002 | Baulier et al. | |
| 7,010,518 B1 * | 3/2006 | Bedell et al. | 1/1 |
| 7,522,539 B2 * | 4/2009 | Nagasawa | 370/254 |
| 7,536,370 B2 * | 5/2009 | Masurkar | 706/47 |
| 7,693,976 B2 * | 4/2010 | Perry et al. | 709/223 |
| 2005/0102193 A1 | 5/2005 | Day et al. | |
| 2005/0138164 A1 | 6/2005 | Burton et al. | |
| 2005/0144618 A1 * | 6/2005 | Howerter et al. | 717/174 |
| 2005/0235057 A1 * | 10/2005 | Brodie et al. | 709/224 |
| 2006/0025985 A1 | 2/2006 | Vinberg et al. | |
| 2006/0277283 A1 | 12/2006 | Bower, III et al. | |
| 2006/0294238 A1 | 12/2006 | Naik et al. | |
| 2007/0130208 A1 | 6/2007 | Bornhoevd et al. | |
| 2007/0271560 A1 | 11/2007 | Wahlert et al. | |
| 2008/0209434 A1 | 8/2008 | Queck et al. | |

* cited by examiner

*Primary Examiner* — Jungwon Chang
(74) *Attorney, Agent, or Firm* — Garg Law Firm, PLLC; Rakesh Garg; Jeffrey S. LaBaw

(57) ABSTRACT

A method, system, and computer usable program product for deploying analytic functions are provided in the illustrative embodiments. A resource is identified in an analytic function specification. A set of input time series is identified for the analytic function specification. An analytic function instance corresponding to the analytic function specification is instantiated in relation to an object of the resource. Each input time series in the set of time series is located in relation to the object. The analytic function instance is associated with each input time series in the set of time series. An analysis is performed using the set of input time series and an analytic function described in the analytic function specification. The analytic function instance is instantiated if both the object and the set of data sources are present in an object graph where the analytic function instance is to be instantiated.

12 Claims, 6 Drawing Sheets

DEPLOYING ANALYTIC FUNCTIONS

RELATED APPLICATION

The present invention is related to similar subject matter of co-pending and commonly assigned U.S. patent application Ser. No. 12/056,853 entitled "SELECTIVE COMPUTATION USING ANALYTIC FUNCTIONS," filed on Mar. 27, 2008, and U.S. patent application Ser. No. 12/056,890 entitled "CLUSTERING ANALYTIC FUNCTIONS," filed on Mar. 27, 2008, which are hereby incorporated by reference.

BACKGROUND OF THE INVENTION

1. Field of the Invention

The present invention relates generally to an improved data processing system, and in particular, to a computer implemented method for performing data analysis. Still more particularly, the present invention relates to a computer implemented method, system, and computer usable program code for deploying analytic functions.

2. Description of the Related Art

Present data processing environments include a collection of hardware, software, firmware, and communication pathways. The hardware elements can be of a vast variety, such as computers, other data processing systems, data storage devices, routers, switches, and other networking devices, to give some examples. Software elements may be software applications, components of those applications, copies or instances of those applications or components.

Firmware elements may include a combination of hardware elements and software elements, such as a networking device with embedded software, a circuit with software code stored within the circuit. Communication pathways may include a variety of interconnections to facilitate communication among the hardware, software, or firmware elements. For example, a data processing environment may include a combination of optical fiber, wired or wireless communication links to facilitate data communication within and outside the data processing environment.

Management, administration, operation, repair, expansion, or replacement of elements in a data processing environment rely on data collected at various points in the data processing environment. For example, a management system may be a part of a data processing environment and may collect performance information about various elements of the data processing environment over a period. As another example, a management system may collect information in order to troubleshoot a problem with an element of the data processing environment. As another example, a management system may collect information to analyze whether an element of the data processing environment is operating according to an agreement, such as a service level agreement.

Furthermore, the various elements of a data processing environment often have components of their own. For example, a router in a network may have many interfaces to which many data processing systems may be connected. A software application may have many components, such as web services and instances thereof, that may be distributed across a network. A communication pathway between two data processing systems may have many links passing through many routers and switches.

Management systems may collect data at or about the various components as well in order to gain insight into the operation, control, performance, troubles, and many other aspects of the data processing environment. Each element or component can be a source of data that is usable in this manner. The number of data sources in some data processing environments can be in the thousands or millions, to give a sense of scale.

Furthermore, not only is the data collected from a vast number of data sources, a variety of data analyses has to be performed on a combination of such data. A software component, a data processing system, or another element of the data processing environment may perform a particular analysis. In some data processing environments, such as the examples provided above for scale, the number of analyses can range in the millions.

Additionally, a particular analysis may be relevant to a particular part of the data processing environment, or use data sources situated in a particular set of data processing environment elements. Consequently, the various elements and components in the data processing environment performing the millions of analyses may be scattered across the data processing environment, communicating and interacting with each other to provide the management insight.

SUMMARY OF THE INVENTION

The illustrative embodiments provide a method, system, and computer usable program product for deploying analytics functions. A resource is identified in an analytic function specification. The resource may include a physical component of an environment. A set of input time series is identified for the analytic function specification. The set of input time series may include data produced by a set of resources in the environment. An analytic function instance corresponding to the analytic function specification is instantiated in relation to an object of the resource. The object may include a logical construct corresponding to the physical component. Each input time series in the set of time series is located in relation to the object. The analytic function instance is associated with each input time series in the set of time series. An analysis is performed using the set of input time series and an analytic function described in the analytic function specification.

Additionally, a determination is made whether the object is present in an object graph where the analytic function instance is to be instantiated. A determination is also made whether each input time series in the set of input time series is present from a set of data sources in the object graph. The analytic function instance is instantiated if both the object and the set of data sources are present.

Furthermore, a temporal semantics is selected from a set of temporal semantics described in the analytic function specification, forming a selected temporal semantics. An input time series in the set of input time series is sampled according to the selected temporal semantics.

An output time series is generated from the analytic function instance. The output time series is provided to a receiver. The receiver may be a second object, a report, a subscriber of the output time series, or a record. The second object may correspond to a second resource or a second analytic function instance.

Also, several data points in an input time series in the set of input time series is stored in a storage medium.

Several analytics checkpoints are also stored in a storage medium. The analytics checkpoints are generated in the course of performing the analysis. The analytic function specification is selected from a set of analytic function specifications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
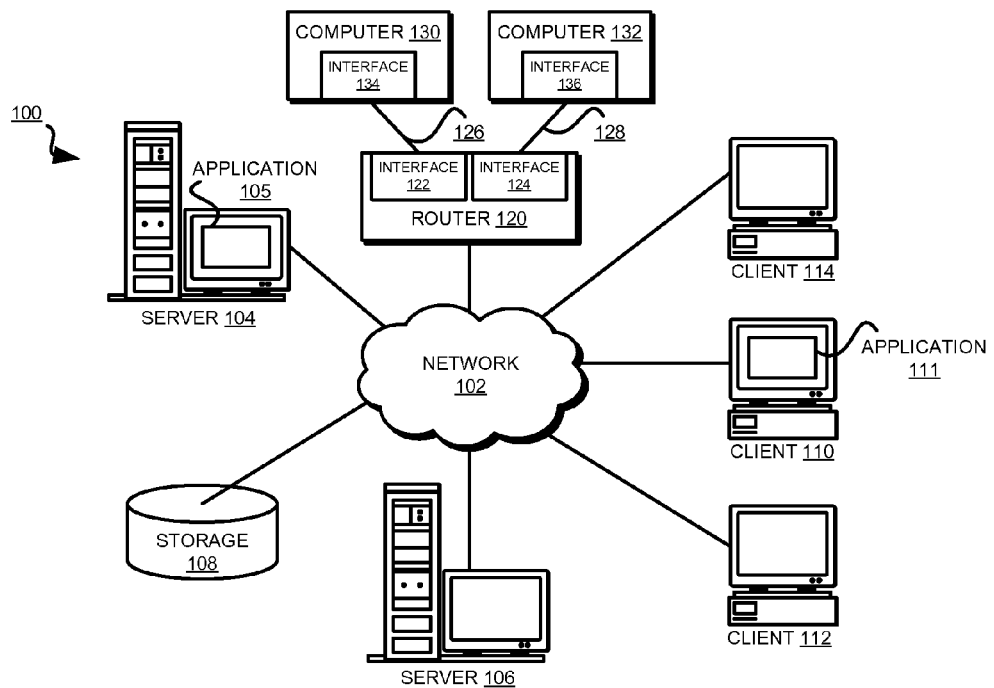
FIG. 1 depicts a pictorial representation of a network of data processing systems in which illustrative embodiments may be implemented.

The illustrative embodiments described herein provide a method, system, and computer usable program product for deploying analytic functions. The illustrative embodiments describe ways for deploying and managing instances of analytic functions in data processing environments, for example, where the number of elements and the number of analyses performed may be large.

An element of a data processing environment, or a component of an element is also known as a resource. When operating in a data processing environment, a resource may have one or more instances. An instance of a resource is a copy of the resource, and each instance of a resource is called an object. A resource type may have one or more instances, each representing an actual object, entity, thing, or a concept in the real world. A resource type is a resource of a certain type, classification, grouping, or characterization.

Additionally, a resource is a physical component of an environment, to wit, a physical manifestation of a thing in the given environment. In some embodiments, a resource is itself a physical thing. For example, a hard disk, a computer memory, a network cable, a router, a client computer, a network interface card, and a wireless communication device are each an example of a resource that is a physical thing. In some embodiments, a resource may be logical construct embodied in a physical thing. For example, a software application located on a hard disk, a computer instruction stored in a computer memory, data stored in a data storage device are each an example of a resource that is a logical construct embodied in a physical thing.

An object is generally a logical construct or a logical representation of a corresponding resource. In many embodiments, an object is a logical structure, a data construct, one or more computer instructions, a software application, a software component, or other similar manifestation of a resource. The logical manifestation of an object is used as an example when describing an object in this disclosure.

However, in some embodiments, an object may itself be a physical manifestation of a physical resource. For example, a compact disc containing a copy of a software application may be a physical object corresponding to a resource that may be a compact disc containing the software application. The illustrative embodiments described in this disclosure may be similarly applicable to physical objects in some cases.

An object may relate to other objects. For example, an actual router present in an actual data processing environment may be represented as an object. The router may have a set of interfaces, each interface being a distinct object. A set of interfaces is one or more interfaces. In this example setup, the router object is related to each interface object. In other words, the router object is said to have a relationship with an interface object.

An object graph is a conceptual representation of the objects and their relationships in any given environment at a given point in time. A point or node in the object graph represents an object, and an arc connecting two nodes represents a relationship between the objects represented by those nodes.

An object may be a data source. A data source is a source of some data. For example, an interface object related to a router object may be data source in that the interface object may provide data about a number of data packets passing through the interface during a specified period.

Objects, object relationships, and object graphs may be used in any context or environment. For example, a particular baseball player may be represented as an object, with a relationship with a different baseball player object in a baseball team object. Note that the baseball player object refers to an actual physical baseball player. Similarly, the baseball team object refers to an actual physical baseball team.

The first baseball player object may be source of data that may be that player's statistics. In other words, that player's statistics, for example, homeruns, is data that the player object—the data source—emits with some periodicity, such as after every game. The baseball team object may also be a data source, emitting team statistics data, which may be dependent on one or more player objects' data by virtue of the team object's relationship with the various player objects. Note that a characteristic of an object, such as emitting data or relating to other objects, refers to a corresponding characteristic of a physical resource in an actual environment that corresponds to the object.

Data emitted by a data source is also called a time series. In statistics, signal processing, and many other fields, a time series is a sequence of data points, measured typically at successive times, spaced according to uniform time intervals, other periodicity, or other triggers. An input time series is a time series that serves as input data. An output time series is a time series that is data produced from some processing. A time series may be an output time series of one object and an input time series of another object.

Time series analysis is a method of analyzing time series, for example to understand the underlying context of the data points, such as where they came from or what generated them. As another example, time series analysis may analyze a time series to make forecasts or predictions. Time series forecasting is the use of a model to forecast future events based on known past events, to wit, to forecast future data points before they are measured. An example in econometrics is the opening price of a share of stock based on the stock's past performance, which uses time series forecasting analytics.

Analytics is the science of data analysis. An analytic function is a computation performed in the course of an analysis. An analytic model is a computational model based on a set of analytic functions. As an example, a common application of analytics is the study of business data using statistical analysis, probability theory, operation research, or a combination thereof, in order to discover and understand historical patterns, and to predict and improve business performance in the future.

An analytic function specification is a code, pseudo-code, scheme, program, or procedure that describes an analytic function. An analytic function specification is also known as simply an analytic specification.

An analytic function instance is an instance of an analytic function, described by an analytic function specification, and executing in an environment. For example, two copies of a software application that implements an analytic function may be executing in different data processing systems in a data processing environment. Each copy of the software application would be an example of an analytic function instance.

As objects have relationships with other objects, analytic function instances can depend on one another. For example, one instance of a particular analytic function may use as an input time series, an output time series of an instance of another analytic function. The first analytic function instance is said to be depending on the second analytic function instance. Taking the baseball team example described above, an analytic function instance that analyzes a player object's statistics may produce the player object's statistics as an output time series. That output time series may serve as an input time series for a different analytic function instance that analyzes the team's statistics.

Furthermore, as an object graph represents the objects and their relationships, a dependency graph represents the relationships and dependencies among analytic function instances. The nodes in a dependency graph represent analytic function instances, and arcs connecting the nodes represent the dependencies between the nodes. Thus, by using a system of logical representations and computations, analytic functions and their instances analyze information and events that pertain to physical things in a given environment.

For example, with a stock market as an environment, analytic functions and their instances may analyze data pertaining to events relating to a real stock, which may be manifested as an identifier or a number in a physical system, or as a physical stock certificate. Analytic functions may thus compute predictions about that stock. As another example, with a baseball league as an environment, analytic functions and their instances may analyze data pertaining to real players and real teams, which manifest as physical persons and organizations. Analytic functions may thus compute statistics about the real persons and organizations in the baseball league.

An analytic function may sample an input time series in several ways. Sampling a time series is reading, accepting, using, considering, or allowing ingress to a time series in the computation of the analytic function. An analytic function may sample an input time series periodically, such as by reading the input time series data points at a uniform interval. An analytic function may also sample an input time series by other trigger. For example, an analytic function may sample an input time series at every third occurrence of some event.

Furthermore, an analytic function may sample a time series based on a "window". A window is a set of time series data points in sequence. For example, an analytic function may sample a time series in a window that covers all data points in the time series for the past one day. As another example, an analytic function may sample a time series in a window that covers all data points in the time series generated for the past thirty events.

Additionally, an analytic function may use a sliding window or a tumbling window for sampling a time series. A sliding window is a window where the span of the window remains the same but as the window is moved to include a new data point in the time series, the oldest data point in the time series in the previous coverage of the window falls off. A tumbling window is a window where the span of the window remains the same but as the window is moved to include a new set of data points in the time series, all the data points in the time series in the previous coverage of the window fall off.

For example, consider that a time series data points are 1, 2, 3, 4, 5, 6, 7, 8, 9, and 10. Also consider that an analytic function uses a window spanning three data points in this time series. At a given instance, the window may be so positioned that the analytic function samples the data points 4, 5, and 6. If the analytic function uses a sliding window, and slides the window one position, the analytic function will sample the data points 5, 6, and 7 in the time series. If the analytic function uses a tumbling window, the analytic function will sample data points 7, 8, and 9 in the time series.

Temporal semantics is a description in an analytic function specification describing how the analytic function samples a time series. Temporal semantics of an analytic function may include window description, including a span of the window and a method of moving the window, that the analytic function uses for sampling the time series.

An analytic function specification may specify a set of temporal semantics for the analytic function. A set of temporal semantics is one or more temporal semantics. For example, the analytic function may use different temporal semantic for different input time series. As another example, an analytic function may provide a user the option to select from a set of temporal semantics a temporal semantics of choice for sampling a time series.

Many implementations store the data points of time series and provide those stored time series to analytic function instances for analyzing after some time. Such a method of providing time series to analytic function instances is called a store and forward processing. Some implementations provide the data points of a time series to an analytic function instance as the data points are received where the analytic function instance may be executing. Such a method of providing time series to analytic function instances is called stream processing.

As described above, an object represents a resource that may be a physical thing in a given environment, and a characteristic of an object refers to a corresponding characteristic of a physical resource that corresponds to the object in an actual environment. Thus, by using a system of logical representations and computations, analytic functions analyze information and events that pertain to physical things in a given environment.

Illustrative embodiments recognize that present analytics techniques, whether using store and forward or stream processing method, are limited in flexibility. For example, a presently available analytic function is tailored to specific resources in specific relationship with each other in a specific situation in a data processing environment. Thus, the illustrative embodiments recognize that a present analytic function when deployed in a data processing environment does not lend itself to redeployment or replication in another part of the data processing environment where a similar set of inputs may be available for similar analysis.

In large data processing environments, or other environments, this rigidity of the method of design and deployment of analytic functions leads to multiple cycles of redevelopment, cloning, and cumbersome management of analytic functions, every time a new use for an existing analytic function is found. The illustrative embodiments recognize that the present method of deploying and managing analytic functions is wasteful, effort intensive, prone to errors, difficult to manage, and therefore undesirable.

To address these and other problems related to using analytic functions, the illustrative embodiments provide a method, system, and computer usable program product for deploying and managing analytic functions. The illustrative embodiments are described using a data processing environment only as an example for the clarity of the description. The illustrative embodiments may be used in conjunction with any application or any environment that may use analytics, including but not limited to data processing environments.

For example, the illustrative embodiments may be implemented in conjunction with a manufacturing facility, sporting environment, financial and business processes, data processing environments, scientific and statistical computations, or any other environment where analytic functions may be used. The illustrative embodiments may also be implemented with any data network, business application, enterprise software, and middleware applications or platforms. The illustrative embodiments may be used in conjunction with a hardware component, such as in a firmware, as embedded software in a hardware device, or in any other suitable hardware or software form.

Any advantages listed herein are only examples and are not intended to be limiting on the illustrative embodiments. Additional advantages may be realized by specific illustrative embodiments. Furthermore, a particular illustrative embodiment may have some, all, or none of the advantages listed above.

Figure 2:
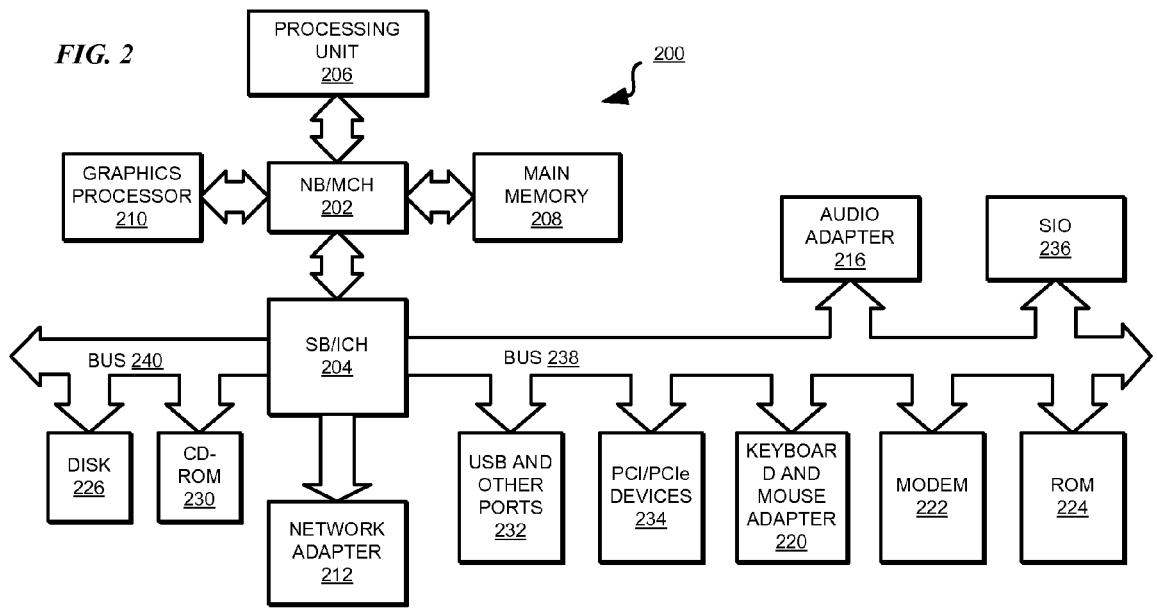
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108 that may include a storage medium.

Software applications may execute on any computer in data processing environment 100. In the depicted example, server 104 includes application 105, which may be an example of a software application, in conjunction with which the illustrative embodiments may be implemented. In addition, clients 112, and 114 couple to network 102. Client 110 may include application 111, which may engage in a data communication with application 105 over network 102, in context of which the illustrative embodiments may be deployed.

Router 120 may connect with network 102. Router 120 may use interfaces 122 and 124 to connect to other data processing systems. For example, interface 122 may use link 126, which is a communication pathway, to connect with interface 134 in computer 130. Similarly, interface 124 connects with interface 136 of computer 132 over link 128.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 provides data, such as boot files, operating system images, and applications to clients 110, 112, and 114. Clients 110, 112, and 114 are clients to server 104 in this example. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® XP (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
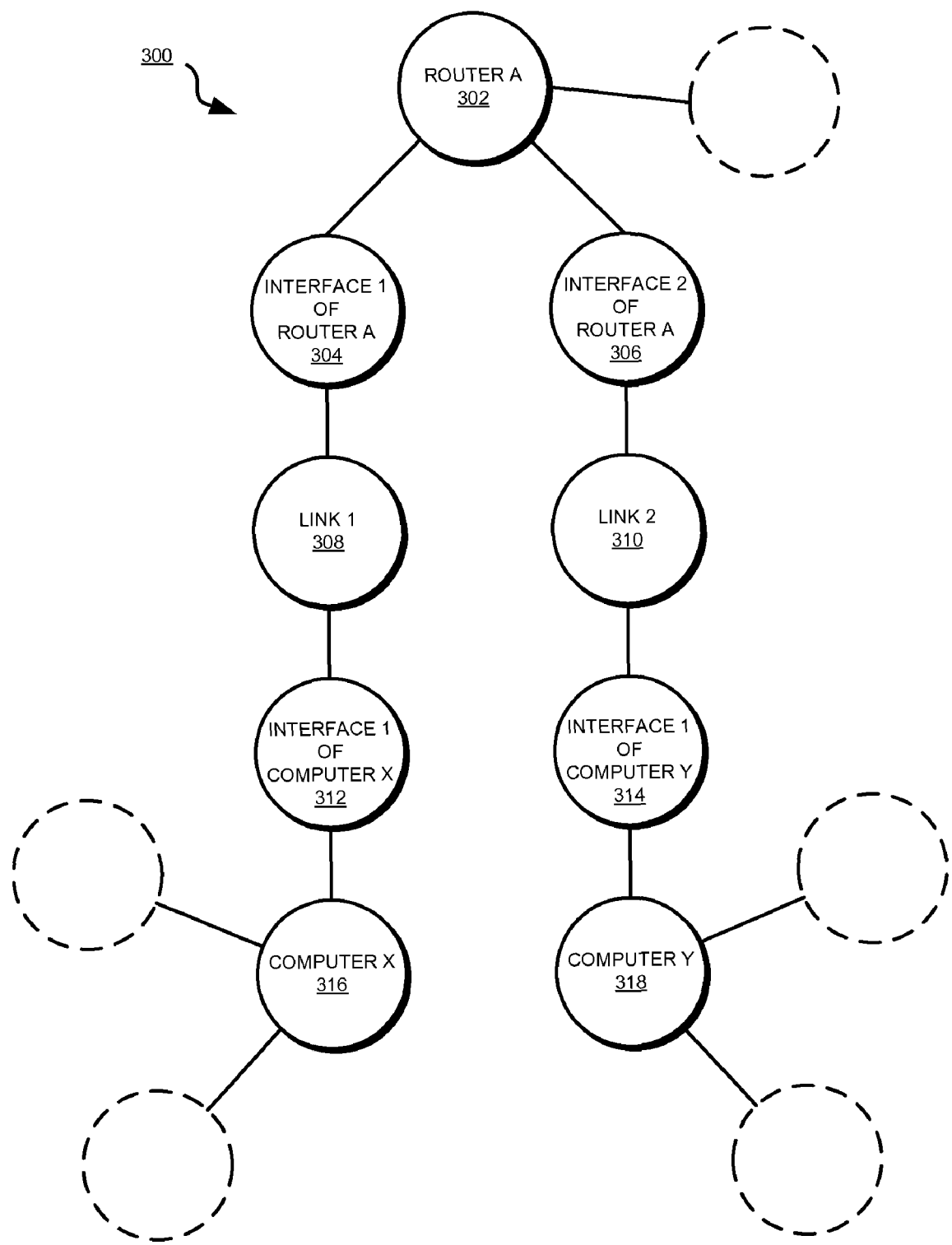
FIG. 3 depicts an object graph in which the illustrative embodiments may be implemented.

With reference to FIG. 3, this figure depicts an object graph in which the illustrative embodiments may be implemented. Object graph 300 may be implemented using a part of data processing environment 100 in FIG. 1. For example, in FIG. 1, servers 104 and 106, clients 110, 112, and 114, storage 108, and network 102 may be resources in data processing environment 100 that may be represented as objects in object graph 300. Each of these resources may include numerous components. Those components may in turn be objects related to the objects representing the resources. Router 120 may be another resource in data processing environment 100 that includes interfaces 122 and 124. Router 120 may be a resource that has relationships with interface 122 resource and interface 124 resource. Router 120 uses data links 126 and 128 to provide data communication services to computers 130 and 132.

In other words, an object representing interface 122 resource is related via an object representing link 126 resource to an object representing interface 134 resource, which is related to an object representing computer 130 resource. Similarly, an object representing interface 124 resource is related via an object representing link 128 resource to an object representing interface 136 resource, which is related to an object representing computer 132 resource. Recall that an object represents a resource that may be a physical thing in a given environment. Further recall that a characteristic of an object, such as emitting data or relating to other objects, refers to a corresponding characteristic of a physical resource in an actual environment that corresponds to the object.

In FIG. 3, object 302 labeled "router A" may be an object representation on object graph 300 of router 120 in FIG. 1. Objects 304 labeled "interface 1 of router A" and object 306 labeled "interface 2 of router A" may be objects representing interfaces 122 and 124 respectively in FIG. 1. Object 302 is related to objects 304 and 306 as depicted by the arcs connecting these objects. Object 302 may similarly be related to any number of other objects, for example, other interface objects similar to objects 304 and 306.

Object 308 labeled "link 1" may represent link 126 in FIG. 1. Object 310 labeled "link 2" may represent link 128 in FIG. 1. Object 312 labeled "interface 1 of computer X" may represent interface 134 in FIG. 1. Object 314 labeled "interface 1 of computer Y" may represent interface 136 in FIG. 1. Object 316 labeled "computer X" may represent computer 130 in FIG. 1. Object 318 labeled "computer Y" may represent computer 132 in FIG. 1. Objects 316 and 318 may similarly be related to any number of other objects, for example, other interface objects similar to objects 312 and 314 respectively.

Thus, object graph 300 represents an example actual data processing environment, example actual elements in that data processing environment, and example relationships among those elements. An object represented in object graph 300 may have any number of relationships with other objects within the scope of the illustrative embodiments.

Furthermore, any object in object graph 300 may act as a data source, emitting one or more time series. An object represents a resource in a given environment. An object emits a time series in an object graph if the resource emits the data points of the time series in the environment. Just as an object may emit one or more time series, an object may not emit any time series at all because a resource corresponding to the object may not emit any data. For example, one type of power supply may not emit any data but simply provide power in a data processing environment. Another type of power supply may include an administration application and emit monitoring data about the status of the power supply. Thus, an object corresponding to the first type of power supply resource may not emit a time series, whereas an object corresponding to the second type of power supply may emit a time series.

Figure 4:
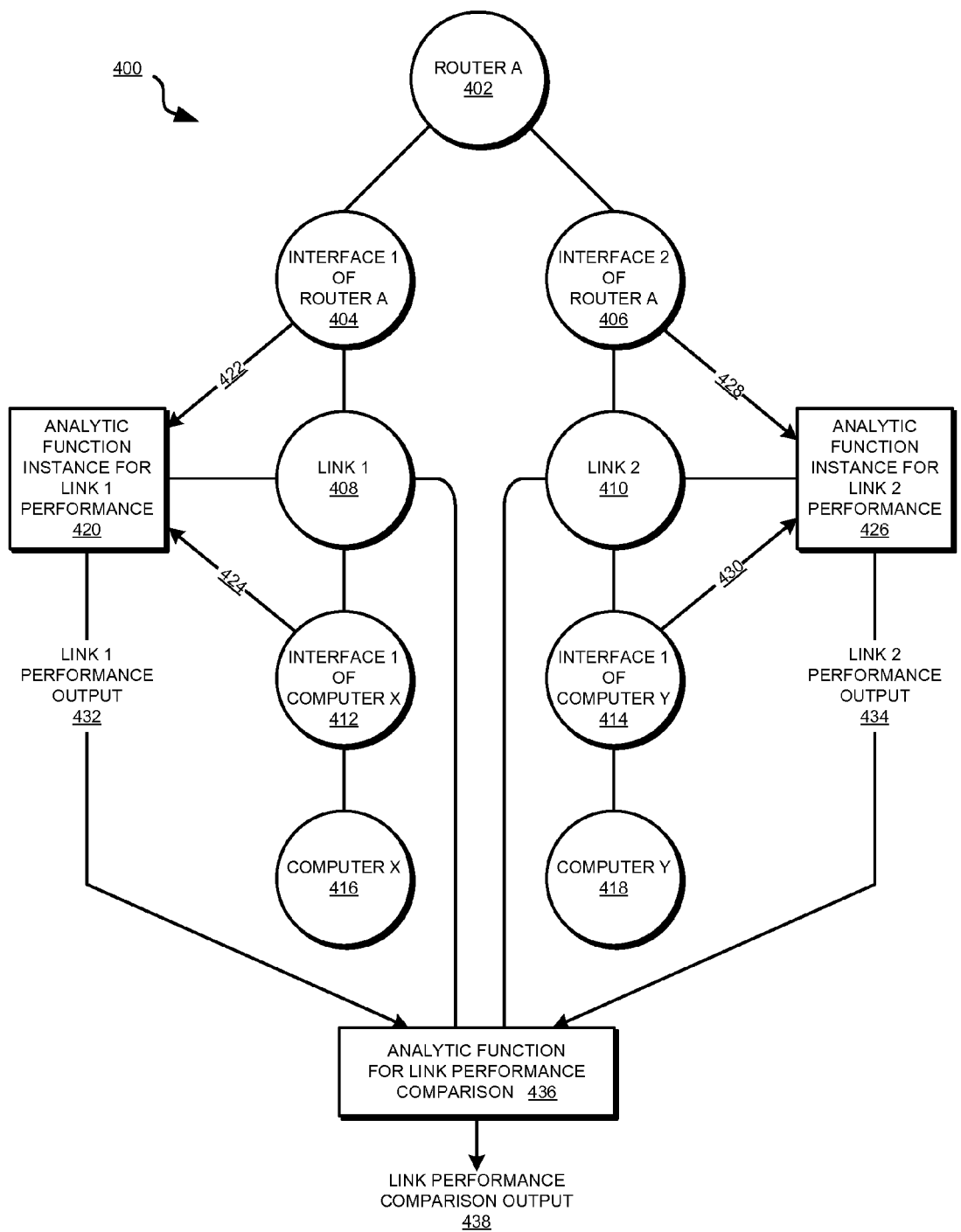
FIG. 4 depicts analytic functions deployed in association with objects in an object graph in accordance with an illustrative embodiment.

With reference to FIG. 4, this figure depicts analytic functions deployed in association with objects in an object graph in accordance with an illustrative embodiment. Object graph 400 may be implemented using object graph 300 in FIG. 3. Object graph 400 may represent any environment suitable for a particular implementation. Object graph 400 is depicted as representing a part of data processing environment 100 in FIG. 1 only as an example for the clarity of the description.

Objects 402, 404, 406, 408, 410, 412, 414, 416, and 418 correspond to objects 302, 304, 306, 308, 310, 312, 314, 316, and 318 respectively in FIG. 1, and bear corresponding labels as in FIG. 3.

An analytic function according to the illustrative embodiments relates to a set of resources in a given environment. A set of resources is one or more resources. The analytic function specification describes relationship of an analytic function to a resource. For example, an analytic function for measuring a performance of a link in a data processing environment may have in the analytic function specification a description of a link with respect to which that analytic function may be deployed in that data processing environment.

In actual deployment, such as when the data processing environment is operational, an instance of that analytic function may be deployed in association with a particular link operating in the operational data processing environment. Once deployed in relation to an actual object the instance of the analytic function in accordance with an illustrative embodiment may navigate, traverse, find, discover, connect, or communicate with objects that may provide the time series that the analytic function uses.

For example, object 420 may be an analytic function instance as described above that may analyze the performance of "link 1" object 408. When object 408 is present in object graph 400, object 420 may be instantiated in relation to object 408. Assume as an example that object 420, an analytic function instance, uses two time series to perform the analysis programmed in the analytic function. The analytic function specification of object 420 may further implement a method for finding the two time series once an instance is associated with an object. Continuing with the example, upon association with object 408, object 420 communicates with objects 404 and 412 to discover the two time series that object 420 is to use for analysis. Object 420 may then receive time series 422 and 424 from objects 404 and 412 respectively.

Object 426 may be another instance of the same analytic function of which object 420 is an instance. Object 426 may similarly be instantiated when object 410 is present in the data processing environment. By virtue of its association with object 426, which is different from object 408, object 426 may find objects 406 and 414 as the providers of its time series. Consequently, object 426 may receive time series 428 and 430 from objects 406 and 414 respectively.

Thus, in this example depiction of deploying instances of analytic functions according to an illustrative embodiment, two copies of a common analytic function are deployed in relation with two different links in a data processing environment. As a result of deployment in this manner, the two instances of the same analytic function produce performance analysis of the two different links overcoming the deployment complications in present analytics solutions.

Furthermore, objects 420 and 426 may generate one or more output time series each. For example, object 420 is depicted as generating output time series 432, and object 426 as generating output time series 434.

Object 436 may be an instance of another analytic function. The specification of the analytic function of object 436 may provide in accordance with an illustrative embodiment that object 436 is instantiated when certain objects are present. For example, object 436 may be instantiated in relation to two or more link objects, such as objects 408 and 410, so that the instance may perform an analysis of their comparative performances.

Thus, when objects 408 and 410 exist in a data processing environment, this other analytic function is instantiated as object 436. Upon instantiation, object 436 finds objects 420 and 426 that may serve as data sources and provide time series 432 and 434 as input time series. Object 436 may then produce output time series 438 that may provide the comparative analysis of the performance of links represented by objects 408 and 410.

The example data processing environment, links, analytic functions, analytic function instances, data sources, and time series used in the description above are not intended to be limiting on the illustrative embodiments. Any analytic function may be implemented according to the illustrative embodiments to relate to objects in any given object graph in this manner. Any analytic function may further be implemented according to the illustrative embodiments to instantiate in relation with those objects. Any analytic function may further be implemented according to the illustrative embodiments to find any data sources corresponding to the relationship with those objects.

Figure 5:
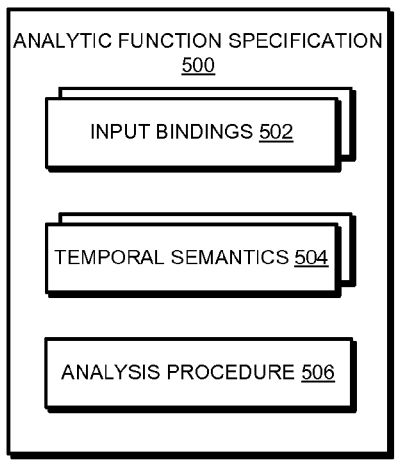
FIG. 5 depicts a block diagram of an analytic function specification in accordance with an illustrative embodiment.

With reference to FIG. 5, its figure depicts a block diagram of an analytic function specification in accordance with an illustrative embodiment. Analytic function specification 500 may be implemented as the analytic function specification for objects 420 and 426 in FIG. 4.

Analytic function specification 500 according to an illustrative embodiment may include a specification for input bindings 502. Input bindings 502 may describe a nature, location, condition, identification, or behavior of one or more resources. Such resources according to input bindings 502, when present as objects, may serve to form relationships with one or more instances of an analytic function according to analytic function specification 500.

Input bindings 502 according to another embodiment may also provide a description of resources whose objects may serve as data sources to an instance of the analytic function specified by analytic function specification 500. In one embodiment, analytic function specification 500 may also allow a user or a deployment process a capability for selecting some or all of the resources specified in input bindings 502 as suitable for particular analytic function instances in a particular environment.

Analytic function specification 500 may further include temporal semantics 504. Temporal semantics 504 may include descriptions of one or more temporal semantics usable by an analytic function instance based on analytic function specification 500. In one embodiment, analytic function specification 500 may also allow a user or a deployment process a capability for selecting same or different temporal semantics specified in temporal semantics 504 as suitable for particular analytic function instances in a particular environment.

Analytic function specification 500 may further include analysis procedure 506. Analysis procedure 506 may include a description of one or more analysis or computation that an analytic function instance based on analytic function specification 500 may perform. In one embodiment, analytic function specification 500 may also allow a user or a deployment process a capability for selecting one or more analysis specified in analysis procedure 506 as suitable for particular analytic function instances in a particular environment.

Figure 6:
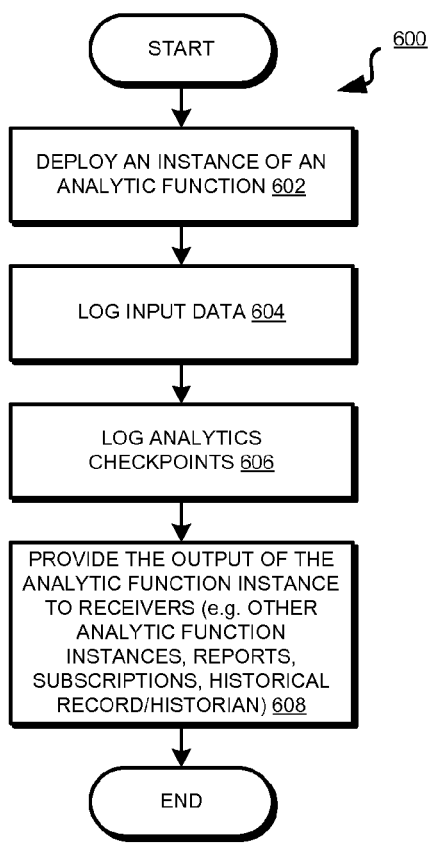
FIG. 6 depicts a flowchart of a process for performing analytics in accordance with an illustrative embodiment.

With reference to FIG. 6, this figure depicts a flowchart of a process for performing analytics in accordance with an illustrative embodiment. Process 600 may be implemented as a software application, such as application 105 in FIG. 1.

Process 600 begins by deploying an instance of an analytic function (step 602). For example, step 602 may include instantiation of an analytic function according to analytic function specification 500 in FIG. 5 and deploying the analytic function instance as object 420 in FIG. 4. Object 420 in FIG. 4 is depicted as relating to object 408 labeled "Link 1". Object 408 in FIG. 4 may be an object representation of an actual link resource, such as link 126 or 128 in an actual data processing environment depicted in FIG. 1. Thus, in one embodiment, process 600 may deploy an analytic function instance that may perform an analysis of a physical communication link in a real environment.

Process 600 may log the input data, such as input time series to the analytic function instance deployed in step 602, (step 604). Process 600 may perform step 604, for example, to recover from a failure in a data processing environment, an unsuccessful deployment of an analytic function instance, or any other reason. In one embodiment, process 600 may perform step 604 and log the input data in a persistent storage medium, such as storage unit 108 in FIG. 1, such that the logged input data may later be provided in a store and forward manner for performing the analysis.

Process 600 may also log analytics checkpoints (step 606). An analytic checkpoint is a state of an analysis at a given point in time. Process 600 may log analytics checkpoints, for example, to resume the analysis from a particular checkpoint instead of having to begin the analysis from the beginning in case of a failure in the data processing environment. As another example, process 600 may log analytics checkpoints for auditing the integrity of the analysis. In one embodiment, process 600 may log the analytics checkpoints of step 606 in a persistent storage medium, such as storage unit 108 in FIG. 1.

Process 600 may provide output of the analytic function instance to any number of receivers (step 608). Process 600 ends thereafter. For example, process 600 may provide an output time series from analytic function instance deployed in step 602 to other analytic function instances, reports, processes and users subscribing to the output, a historical record, or a user or process acting as a historian of the environment.

Figure 7:
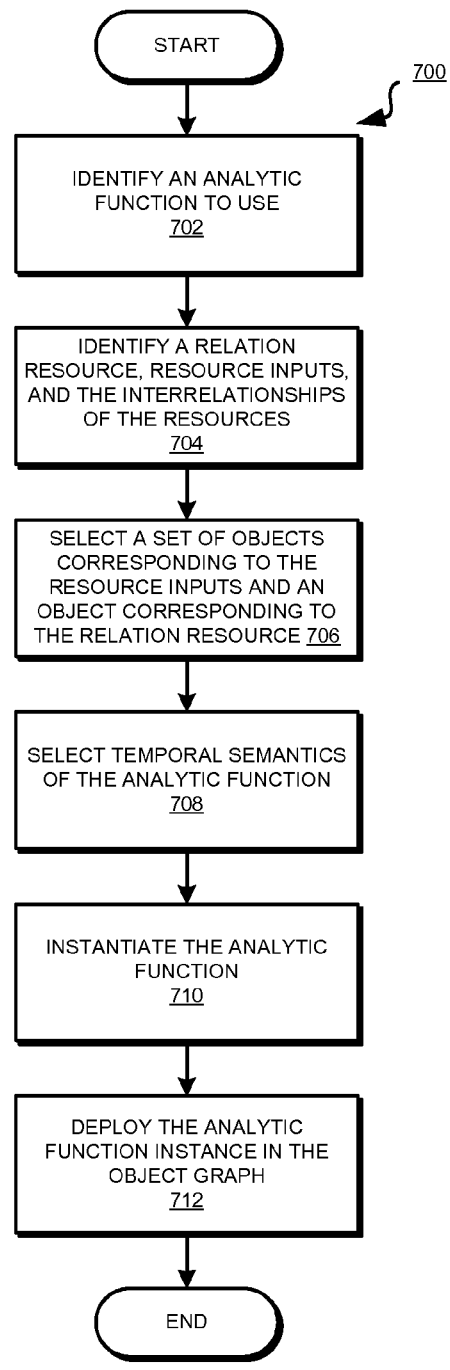
FIG. 7 depicts a flowchart of a process of deploying an analytic function instance in accordance with an illustrative embodiment.

With reference to FIG. 7, this figure depicts a flowchart of a process of deploying an analytic function instance in accordance with an illustrative embodiment. Process 700 may be implemented as step 602 in FIG. 6.

Process 700 begins by identifying an analytic function to use (step 702). For example, a set of analytic functions may be relevant in a given data processing environment. A set of analytic functions is one or more analytic functions. The set of analytic functions may be described in a set of analytic function specifications. A set of analytic function specifications is one or more analytic function specifications. A user or a deployment process may select an analytic function, by selecting an analytic function specification from the set of analytic function specifications.

Process 700 identifies a resource in relation with which the selected analytic function may be instantiated, and a set of resource inputs and their interrelationships that may be relevant to the selected analytic function (step 704). Such a resource is called a "deployment resource". A resource input is a resource whose object serves as a data source providing an input time series. A set of resource inputs is one or more resource inputs. A resource may be related to another resource in that their objects in an object graph may be related, such as depicted in FIGS. 3 and 4. Interrelationships among resources may be represented in an object graph. Input bindings specified in an analytic function specification may determine input time series using such interrelationships. An analytic function specification, such as the analytic function specification used in step 702, may use the interrelationships among resources when an instance of the analytic function is instantiated in the object graph.

Process 700 may select an object corresponding to the deployment resource (step 706). An implementation of process 700 may also select in step 706, a set of objects corresponding to the resource inputs identified in step 704.

Process 700 selects a temporal semantics from the analytic function specification of step 702(step 708). As described with respect to FIG. 5, an analytic function specification may describe a set of temporal semantics from which a user or a deployment process may select a temporal semantics.

Process 700 instantiates the analytic function corresponding to the analytic function specification of step 702 in relation to the various objects identified in steps 704 and 706, with temporal semantics selected in step 708 (step 710). Process 700 deploys the instance of step 708 in the object graph (step 712). Process 700 ends thereafter. In deploying the instance in 712, process 700 may, for example, bind to certain objects, establish communication with data sources, condition an input time series, prepare a log file or database to receive log information, or perform other actions suitable in a particular implementation.

Figure 8:
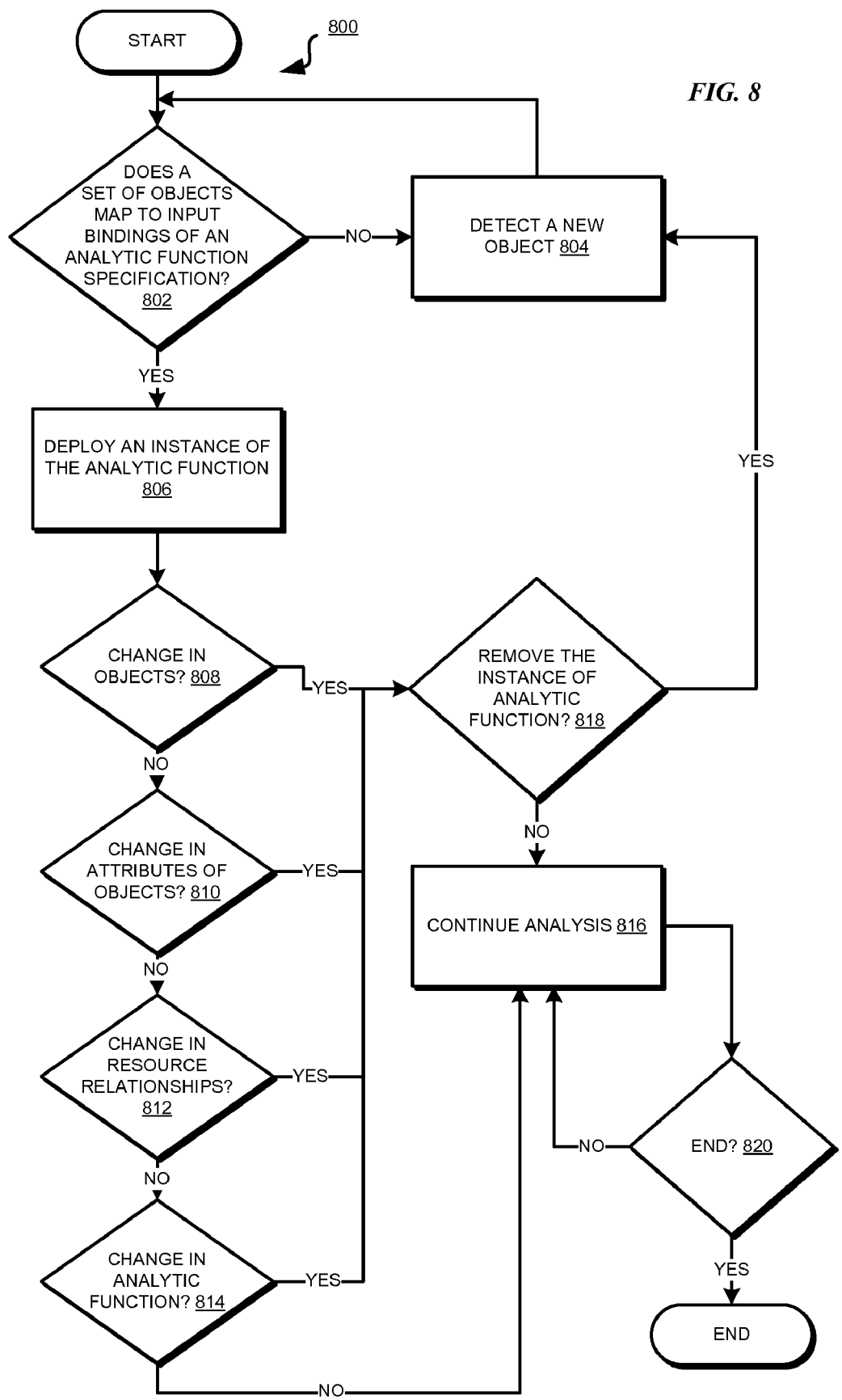
FIG. 8 depicts a flowchart of a process for deploying and managing analytic function instances in accordance with an illustrative embodiment.

With reference to FIG. 8, this figure depicts a flowchart of a process for deploying and managing analytic function instances in accordance with an illustrative embodiment. Process 800 may be implemented in a software application, such as application 105 in FIG. 1. Furthermore, process 800 may be implemented in conjunction with an analytic function instance deployment process, such as process 600. Process 800 may execute with respect to an abject graph, such as object graphs 300 and 400 in FIGS. 3 and 4.

Process 800 begins by determining if a set of objects map or correspond to the input bindings specified in an analytic function specification of an analytic function instance (step 802). Note that step 802 may execute to determine whether an object corresponding to a deployment resource exists, objects corresponding to the resource inputs exist, or a combination thereof exists in an object graph.

If process 800 determines that a set of objects does not map to the input bindings of the analytic function instance ("No" path of step 802), process 800 continues to monitor and detect new objects as they are added to the object graph (step 804). If process 800 determines that a set of objects maps to the input bindings of the analytic function instance ("Yes" path of step 802), process 800 deploys an instance of the analytic function (step 806).

Process 800 monitors the object graph for changes in the objects (step 808). Process 800 may monitor for changes in the objects that directly or indirectly relate to the analytic function instance instantiated in step 806. An object directly relates to an analytic function instance if a resource corresponding to the object is identified in the input bindings of the analytic function instance. An object indirectly relates to an analytic function instance if the object relates to another object through a chain of relationships where the other object corresponds to a resource identified in the input bindings of the analytic function instance. A change in an object is a change of a state of an object during the operation of the environment. For example, an object may change by turning its services off or on.

If process 800 determines that an object has not changed ("No" path of step 808), process 800 determines if an attribute of an object has changed (step 810). An attribute of an object is a property, parameter, value, or a characteristic of the object. Process 800 may monitor for changes in the attributes of objects that directly or indirectly relate to the analytic function instance instantiated in step 806.

If process 800 determines that an attribute of an object has not changed ("No" path of step 810), process 800 determines if a relationship between objects has changed (step 812). The relationship between objects being monitored in step 812 may be a relationship between objects that are data sources, between an object of deployment resource and the analytic function instance, between a data source object and the analytic function instance, a data source and an object of the deployment resource, or any other combination of such objects. Again, process 800 may monitor for changes in the relationships of objects that directly or indirectly relate to the analytic function instance instantiated in step 806.

If process 800 determines that a relationship between objects has not changed ("No" path of step 812), process 800 determines if an analytic function of the analytic function instance has changed (step 814). The process by which the analytic function may be changed is described with respect to FIG. 9. If process 800 determines that an analytic function of the analytic function instance has not changed ("No" path of step 814), process 800 continues the analysis using the analytic function instance (step 816).

If process 800 determines that an object has changed ("Yes" path of step 808), or that an attribute of an object has changed ("Yes" path of step 810), a relationship between objects has changed ("Yes" path of step 812), or an analytic function of the analytic function instance has changed ("Yes" path of step 814), process 800 determines whether to remove the analytic function instance created in step 806 (step 818). If process 800 determines that the analytic function instance does not have to be removed ("No" path of step 818), process 800 proceeds to step 816 and continues to use the analysis using the analytic function instance. If process 800 determines that the analytic function instance has to be removed ("Yes" path of step 818), process 800 proceeds to step 804 and continues monitoring for new objects in the object graph.

In one embodiment, process 800 may determine whether the analytic function instance has to be modified instead of removed in step 818. In one implementation of such an embodiment, process 800 may modify the analytic function instance during the instance's execution. In another implementation of such an embodiment, process 800 may remove, modify and re-instantiate the analytic function instance. In performing step 818, a particular implementation of process 800 may modify the analytic function instance in any manner suitable for the environment without departing from the scope of the illustrative embodiments.

Returning to step 816, process 800 proceeds from step 816 to determining if process 800 should end the deployment and management of the analytic function instances (step 820). If process 800 determines not to end the deployment and management of the analytic function instances ("No" path of step 820), process 800 returns to step 816. If process 800 determines to end the deployment and management of the analytic function instances ("Yes" path of step 820), process 800 ends thereafter.

Figure 9:
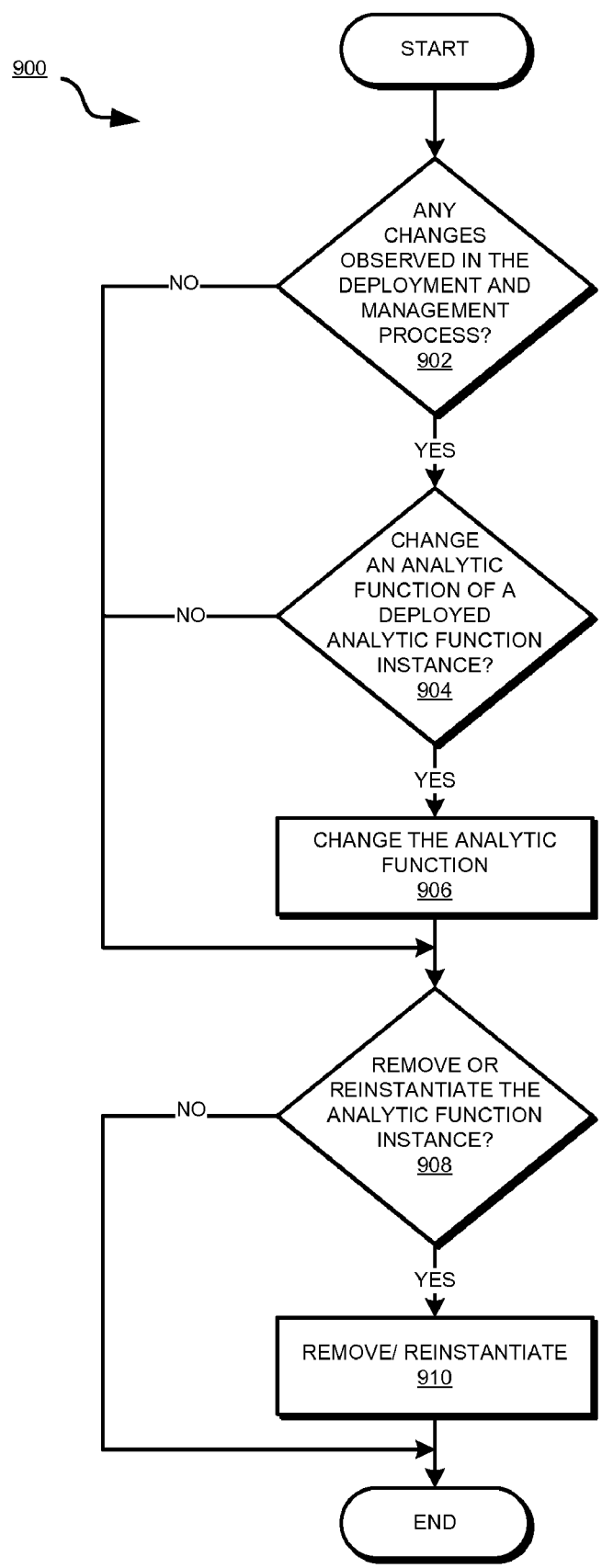
FIG. 9 depicts a flowchart of a process of changing an analytic function in accordance with an illustrative embodiment.

With reference to FIG. 9, this figure depicts a flowchart of a process of changing an analytic function in accordance with an illustrative embodiment. Process 900 may be deployed in a software application, such as application 105 in FIG. 1. Furthermore, process 900 may be deployed in conjunction with an analytic function instances deployment and management process, such as process 800 in FIG. 8.

Process 900 begins by determining if any changes were observed in an analytic function instances deployment and management process (step 902). Process 900 may use the determinations of any of steps 808, 810, 812, or 814 in FIG. 8 to make the determination of step 902.

If process 900 determines that one or more changes were observed in an analytic function instances deployment and management process ("Yes" path of step 902), process 900 determines if a change in an analytic function of a deployed analytic function instance is warranted due to the change observed in step 902 (step 904). For example, an analysis may have to change if a data source object has turned off, or a relationship has changed permanently.

If process 900 determines that a change in an analytic function of a deployed analytic function instance is warranted ("Yes" path of step 904), process 900 makes the change in the analytic function (step 906). In one embodiment, process 900 may notify a user or another process to make the change of step 906.

Process 900 determines whether to remove the existing analytic function instance due to the change, or re-instantiate the analytic function instance with the change (step 908). If process determines to remove or re-instantiate (step 910), process 900 removes or re-instantiates the analytic function instance (step 912). Process 900 ends thereafter. In one embodiment, process 900 may remove the existing analytic function instance by passing control to the "Yes" path of step 818 in FIG. 8.

If process 900 determines that no changes were observed in an analytic function instances deployment and management process ("No" path of step 902), or a change in an analytic function of a deployed analytic function instance is not warranted ("No" path of step 904), process 900 may proceed to step 908. If process 900 determines that the existing analytic function instance does not have to be removed or re-instantiated ("No" path of step 908), process 900 ends thereafter. In one embodiment, process 900 may pass control to step 816 in FIG. 8 instead of ending. Additionally, in a particular implementation, process 900 may be used as step 818 in FIG. 8 such that step 818 modifies the analytic function instance of process 800 instead of removing the instance as described above.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for deploying analytic functions. An object represents a resource that may be a physical thing in a given environment, and a characteristic of an object refers to a corresponding characteristic of a physical resource that corresponds to the object in an actual environment. Thus, by using a system of logical representations and computations, analytic functions analyze information and events that pertain to physical things in a given environment.

A user or a deployment process may deploy analytic function instances by relating an analytic function with a resource in a given environment. When the resource is detected in the environment, the analytic function is instantiated in relation to the resource and suitable data sources for receiving data for analysis are located with respect to the resource.

Specifically, the illustrative embodiments deploy analytic function instances in relation to an object in an object graph. Furthermore, the illustrative embodiments deploy the analytic function instances such that the analytic functions are able to discover other objects that act as data sources. The analytic function instances deployed according illustrative embodiments use the time series that the data source objects produce in a stream possessing methodology. The illustrative embodiments may also be practiced in conjunction with environments where input time series are stored and forwarded to analytic functions.

Analytic function deployment and management processes according to the illustrative embodiments change, modify, remove, add, instantiate, or re-instantiate analytic functions based on changes in the resources in an environment. Processes according to the illustrative embodiments may allow a user or a process to configure an analytic function instance different from another analytic function instance of the same analytic function specification.

The illustrative embodiments may be used in conjunction with any application or any environment that may use analytics. An example of such environments where the illustrative embodiments are applicable is a data processing environment, such as where a number of data processing systems, computing devices, communication devices, data networks, and components thereof may be in communication with each other. As another example, the illustrative embodiments may be implemented in conjunction with financial and business processes, such as where a number of persons, devices, or instruments may generate reports, catalogs, trends, factors, or values that have to be analyzed in a dynamic or changing environment.

As another example, the illustrative embodiments may be implemented in scientific and statistical computation environments, such as where a number of data processing systems, devices, or instruments may produce data that has to be analyzed in an unpredictable or dynamic environment. As another example, the illustrative embodiments may be implemented in a manufacturing facility where equipment, gadgets, systems, and personnel may produce products and information related to products in a flexible or dynamic environment.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from the bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for managing analytic function instances, the method comprising:
    deploying an analytic function instance in relation to a first object, the first object in an object graph comprising a logical construct corresponding to a resource in an environment, the resource comprising a physical component of the environment;
    determining if an object in the object graph has changed states, forming an object state determination;
    determining if the object in the object graph has a changed attribute, forming an object attribute determination;
    determining if a relationship between two objects in the object graph has changed, forming object relationship determination;
    modifying the analytic function instance, responsive to any of the object state determination, the object attribute determination, and the object relationship determination being true.

2. The computer implemented method of claim 1, further comprising:
  determining if an analytic function in an analytic function specification corresponding to the analytic function instance has changed, forming an analytic function change determination; and
  modifying the analytic function instance, responsive to the analytic function change determination being true.

3. The computer implemented method of claim 1, wherein the relationship between the two objects is between one of (i) two data sources, (ii) an object corresponding to a resource specified in an input bindings in an analytic function specification of the analytic function instance and the analytic function instance, and (iii) the analytic function instance and a second analytic function instance.

4. The computer implemented method of claim 1, wherein modifying the analytic function instance includes removing the analytic function instance from the object graph.

5. The computer implemented method of claim 1, wherein one of the object state determination, the object attribute determination, and the object relationship determination is formed using an object one of (i) directly related to the analytic function instance and (ii) indirectly related to the analytic function instance.

6. The computer implemented method of claim 1, further comprising:
  detecting a new object in the object graph, the new object comprising a logical construct corresponding to a second physical component of the environment;
  determining if a set of objects in the object graph including the new object corresponds to an input bindings specified in an analytic function specification in a set of analytic function specifications, forming a input bindings determination; and
  deploying, responsive to the input bindings determination being true, a second analytic function instance corresponding to the analytic function specification.

7. A data processing system for managing analytic function instances, the data processing system comprising:
  a storage device, wherein the storage device stores computer usable program code; and
  a processor, wherein the processor executes the computer usable program code, and wherein the computer usable program code comprises:
  computer usable code for deploying an analytic function instance in relation to a first object, the first object in an object graph comprising a logical construct corresponding to a resource in an environment, the resource comprising a physical component of the environment;
  computer usable code for determining if an object in the object graph has changed states, forming an object state determination;
  computer usable code for determining if the object in the object graph has a changed attribute, forming an object attribute determination;
  computer usable code for determining if a relationship between two objects in the object graph has changed, forming object relationship determination;
  computer usable code for modifying the analytic function instance, responsive to any of the object state determination, the object attribute determination, and the object relationship determination being true.

8. The data processing system of claim 7, further comprising:
  computer usable code for determining if an analytic function in an analytic function specification corresponding to the analytic function instance has changed, forming an analytic function change determination; and
  computer usable code for modifying the analytic function instance, responsive to the analytic function change determination being true.

9. The data processing system of claim 7, wherein the relationship between the two objects is between one of (i) two data sources, (ii) an object corresponding to a resource specified in an input bindings in an analytic function specification of the analytic function instance and the analytic function instance, and (iii) the analytic function instance and a second analytic function instance.

10. The data processing system of claim 7, wherein the computer usable code for modifying the analytic function instance includes computer usable code for removing the analytic function instance from the object graph.

11. The data processing system of claim 7, wherein one of the object state determination, the object attribute determination, and the object relationship determination is formed using one of (i) an object directly related to the analytic function instance and (ii) an object indirectly related to the analytic function instance.

12. The data processing system of claim 7, further comprising:
  computer usable code for detecting a new object in the object graph, the new object comprising a logical construct corresponding to a second physical component of the environment;
  computer usable code for determining if a set of objects in the object graph including the new object corresponds to an input bindings specified in an analytic function specification in a set of analytic function specifications, forming a input bindings determination; and
  computer usable code for deploying, responsive to the input bindings determination being true, a second analytic function instance corresponding to the analytic function specification.

* * * * *